US009913099B2

(12) United States Patent
Watkins et al.

(10) Patent No.: US 9,913,099 B2
(45) Date of Patent: *Mar. 6, 2018

(54) CRASH EVENT DETECTION, RESPONSE AND REPORTING APPARATUS AND METHOD

(71) Applicant: Mobile Video Computing Solutions LLC, Sterling Heights, MI (US)

(72) Inventors: D Scott Watkins, Huntington Woods, MI (US); Craig A Tieman, Westfield, IN (US)

(73) Assignee: Mobile Video Computing Solutions, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,265

(22) Filed: Feb. 16, 2017

(65) Prior Publication Data

US 2017/0164158 A1 Jun. 8, 2017

Related U.S. Application Data

(63) Continuation-in-part of application No. 14/819,879, filed on Aug. 6, 2015.

(60) Provisional application No. 62/034,070, filed on Aug. 6, 2014, provisional application No. 62/034,247, filed on Aug. 7, 2014.

(51) Int. Cl.
| | |
|---|---|
| *H04W 4/02* | (2009.01) |
| *H04W 4/04* | (2009.01) |
| *H04W 4/22* | (2009.01) |
| *G06Q 40/08* | (2012.01) |

(52) U.S. Cl.
CPC ............ *H04W 4/027* (2013.01); *G06Q 40/08* (2013.01); *H04W 4/046* (2013.01); *H04W 4/22* (2013.01)

(58) Field of Classification Search
CPC .......... G07C 5/008; G06Q 40/08; H04W 4/22
USPC .................................... 455/404.2, 456.1–457
See application file for complete search history.

(56) References Cited

U.S. PATENT DOCUMENTS

| | | |
|---|---|---|
| 8,774,752 B1 | 7/2014 | Akcasu |
| 2002/0093565 A1 | 7/2002 | Watkins |
| 2002/0103622 A1 | 8/2002 | Burge |
| 2002/0145666 A1 | 10/2002 | Scaman |
| 2005/0040937 A1 | 2/2005 | Cuddihy |
| 2005/0197771 A1 | 9/2005 | Seick |
| 2005/0252308 A1 | 11/2005 | Hjelt |
| 2007/0194893 A1 | 8/2007 | Deyoe |

(Continued)

OTHER PUBLICATIONS

Mobile Video Computing Solutions, PCT/US2017/017696, International Search Report, dated May 10, 2017.

(Continued)

*Primary Examiner* — Sam Bhattacharya
(74) *Attorney, Agent, or Firm* — Baker Donelson

(57) ABSTRACT

A crash detection system with a mobile communications device configured for periodically interrogating (a) a motion signal to determine whether a change in motion (acceleration or angular rotation) exceeds a predetermined motion threshold and (b) a sound signal to determine whether a sequence of sensed sound signals within a predetermined period matches crash sound indicators of (i) glass breakage and (ii) metal folding, displaying selectable options upon detection of a crash incident, and upon a failure to select within a predetermined period, communicating an identifier and crash incident information dispatch center for dispatching a response servicer.

8 Claims, 8 Drawing Sheets

(56) References Cited

U.S. PATENT DOCUMENTS

2009/0106052 A1    4/2009  Moldovan
2010/0142715 A1    6/2010  Goldstein
2012/0076437 A1    3/2012  King
2015/0024705 A1    1/2015  Rashidi
2015/0035665 A1    2/2015  Plante
2015/0084757 A1    3/2015  Annibale

OTHER PUBLICATIONS

Mobile Video Computing Solutions, PCT/US2017/017696, Written Opinion, dated May 10, 2017.

CRASH EVENT DETECTION, RESPONSE AND REPORTING APPARATUS AND METHOD

TECHNICAL FIELD

The present invention relates to apparatus and methods for responding to motor vehicle crash events. More particularly, the present invention relates to apparatus and methods for detecting the occurrence of a motor vehicle crash, responding to the detection of the motor vehicle crash, and reporting the detection of the motor vehicle crash.

BACKGROUND OF THE INVENTION

In recent years, improved roadways, traffic control devices, and safety devices that are installed and operated in motor vehicles have resulted in safer transportation by motor vehicle. Nevertheless, incidents and accidents involving car and truck motor vehicles continue to occur. These include vehicle-to-vehicle collisions as well as single vehicle accidents. While typically such incidents occur in locations where response personnel may be readily directed to provide medical and tow services, some incidents involving disappearance of the motor vehicle and its operation occur (such as a single vehicle accident in which the vehicle leaves the roadway and becomes hidden from view in woods or water).

Also, monitoring services seek "how am I driving" reports typically for fleet operators to monitor driving activities of vehicle operators but parents having children as new or inexperienced drivers also have become interested in monitoring and reporting on motor vehicle operations.

While systems having GPS location tracking features and cellular telecommunications devices have been installed in motor vehicles for communications between occupants and a tracking service provider, there are drawbacks to such systems. The operator may be injured or blocked from initiating communications. Also, the operator may be using a different vehicle such as a rental vehicle.

Accordingly, there is a need in the art for an improved system and method for detecting occurrences of motor vehicle incidents, responding to detection of motor vehicle incident occurrences, and tracking and reporting on detection of and responses to motor vehicle incident occurrences. It is to such that the present invention is directed.

BRIEF SUMMARY OF THE INVENTION

The present invention meets the needs in the art by providing a system for detection of a crash of a motor vehicle with crash detection response and reporting, comprising a mobile communications device configured with a sensor that generates a motion signal responsive to changes in motion of the mobile communications device and a sound receiver for receiving a sound signal of sound proximate the mobile communications device, and including software instructions that upon execution monitors for an occurrence of a crash event by periodically interrogating (a) the motion signal to determine whether a change in motion exceeds a predetermined motion threshold and (b) the sound signal to determine whether a sequence of sensed sound signals within a predetermined period matches crash sound indicators of (i) glass breakage and (ii) metal folding. A display that upon determining the occurrence of the crash incident displays a possible event window with a selectable option (a) to return the mobile communications device to monitoring for the occurrence of the crash incident or (b) to confirm the crash incident. Upon a failure of selection of one of the selectable options within a predetermined period, communicating by a communications network an identifier associated with the mobile communications device and crash incident information including a location data to a tracking and dispatch center having a pre-registered record of the mobile communications device and configured for receiving and storing the acceleration information and the sound signals on which the crash incident was determined. The tracking and dispatch center is configured to dispatch a servicer to a site of the crash incident based on the location data.

In another aspect, the present invention provides a motor vehicle crash detection system, comprising a tracking and dispatch center having a computer processor configured with an electronic memory device that maintains driver information of driver name, address, insurance company and policy number for a plurality of drivers and maintains vehicle crash information of motor vehicle, crash location data, date and time, and optionally one or more sequences of sounds from a crash location, one or more images thereof, for a plurality of crashed motor vehicles. A plurality of mobile communications devices, each associated with a respective one of the plurality of drivers are each configured with a sensor that generates a motion signal responsive to changes in motion of the mobile communications device and a sound receiver for receiving a sound signal of sound proximate the mobile communications device. The mobile communications device configured with software instructions that upon execution monitors for an occurrence of a crash event by periodically interrogating (a) the motion signal to determine whether a change in motion exceeds a predetermined motion threshold and (b) the sound signal to determine whether a sequence of sensed sound signals within a predetermined period matches crash sound indicators of (i) glass breakage and (ii) metal folding. Upon determining the occurrence of the crash incident a display displays a possible event window for selection of one of (a) to return the mobile communications device to monitoring for the occurrence of the crash incident and (b) to confirm the crash incident. Upon a failure of selection of one of the selectable options within a predetermined period, the mobile communications device communicates by a communications network an identifier associated with the mobile communications device and crash incident information of a location data, date and time to the tracking and dispatch center. The tracking and dispatch center dispatches at least one response servicer to a site of the crash incident based on the location data. The response servicer provides a lantern device having a light, an imaging device, and a communications device. Images received by the imaging device communicate by the communications device through the network to the tracking and dispatch center.

In yet another aspect, the present invention provides a method system for detecting a crash incident of a motor vehicle with crash detection response and reporting, comprising the steps of:

(a) providing a mobile communications device having a sensor that generates a motion signal responsive to motion of the mobile communications device and a sound receiver for receiving a sound signal of sound proximate the mobile communications device, with software instructions configured for execution for monitoring for an occurrence of a crash event;

(b) periodically interrogating (a) the motion signal to determine whether a change in motion exceeds a predetermined motion threshold and (b) the sound signal to determine whether a sequence of sensed sound signals within a predetermined period matches crash sound indicators of (i) glass breakage and (ii) metal folding;

(c) based on interrogations of the motion signal and the sound signal, determining that the crash incident occurred;

(d) making an alert as to the crash incident with the mobile communications device;

(e) determining whether the alert generated a crash response through the mobile communications device, and if not, communicating a location data of the crash incident to a service provider for response; and (f) communicating a status of the service provider response to the mobile communications device.

Objects, advantages, and features of the present invention may be readily determined upon a reading of the following detailed description in conjunction with the drawings and the appended claims.

Objects, advantages and features of the present invention of crash event detection, response and reporting apparatus and method will become readily apparent upon a reading of the following detailed description in reference to the drawings and the appended claims.

DETAILED DESCRIPTION

Figure 1:
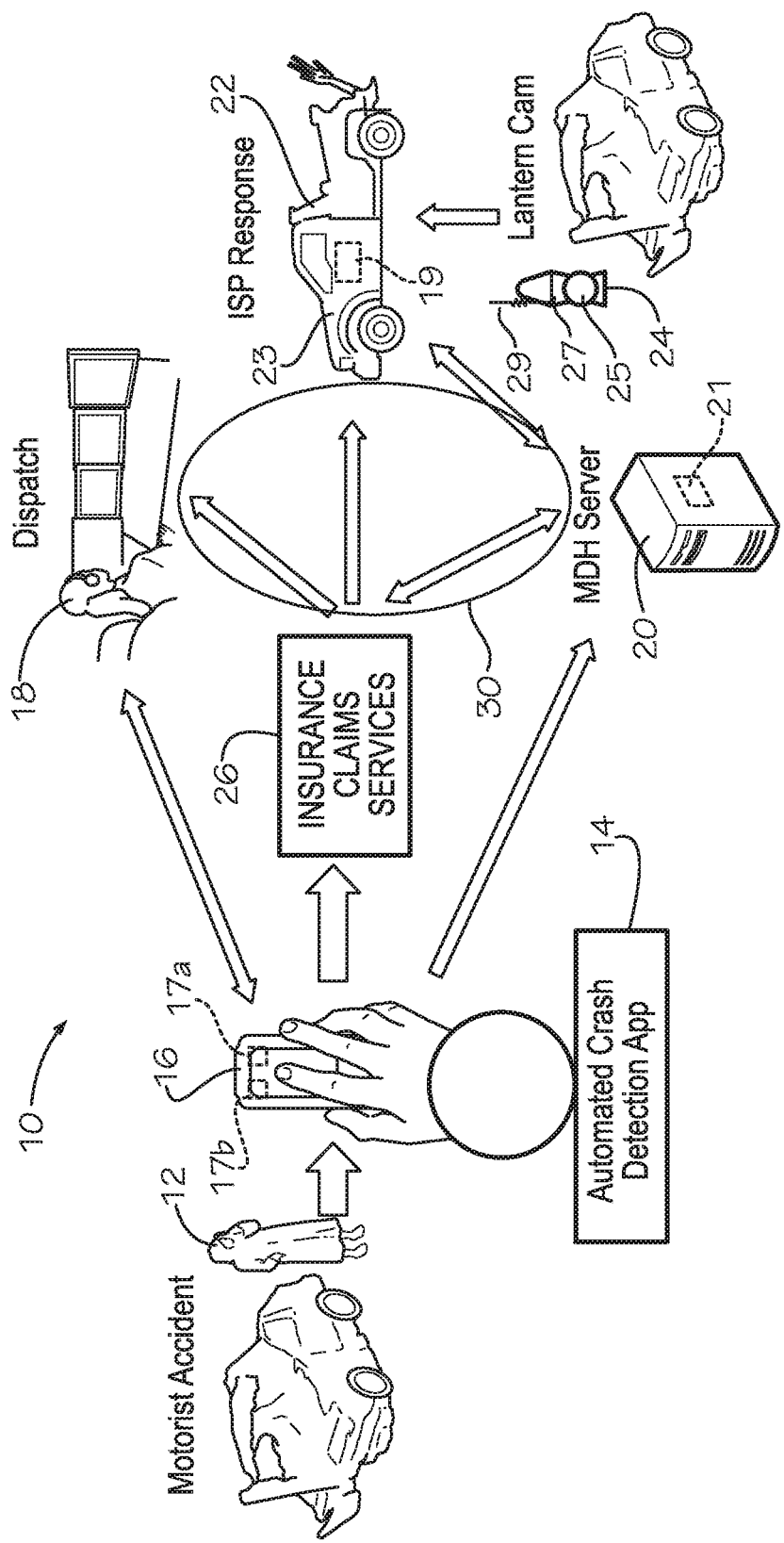
FIG. 1 illustrates a schematic overview of an illustrative embodiment of a crash detection, response, and reporting apparatus in accordance with the present invention.

With reference to the drawings, in which like parts have like reference numerals, FIG. 1 illustrates a schematic overview of an illustrative embodiment of a crash detection, response, and reporting apparatus 10 in accordance with the present invention. The apparatus 10 supports motor vehicle insurance and tracking services for drivers of motor vehicles 12 with a computer software application 14 configured for crash detection, response and reporting operable on a mobile communications device 16. The mobile communications device 16 includes a microprocessor device, communications module, and display. The mobile communications device includes, but is not limited to cellular telephone, tablet computer, laptop portable computer, or other similar microprocessor device configured with an operating system, information input devices (mouse, keyboard, touchscreen, actual or virtual), and a display device for presentation of information during operation of the application. For example, the possession of cellular telephones is becoming more prevalent. The application 14 resident on the cellular telephone in the possession of the driver during motor vehicle operation, and operating in a background mode, provides a passively present crash detection, response, and reporting feature for drivers as well as others having an interest in the status of the driver and the motor vehicle. The mobile communications device 16 includes conventionally an accelerometer 17a for detecting changes in linear acceleration and alternatively a gyroscope 17b (one or more axis) configured for detecting changes in angular rotation of the device. The accelerometer 17a and the gyroscope 17b detect changes in motion of the mobile communications device and thus may indicate changes in the status of the motor vehicle (i.e., especially a potential crash based on rapid changes in acceleration and/or rapid changes in angular rotation). The application 14 periodically interrogates and determines changes in motion of the mobile communications device (acceleration and/or angular rotation) by communicating with, and receiving one or more motion signals from the accelerometer 17a and from the gyroscope 17b. In an alternate embodiment, the accelerometer 17a and/or gyroscope 17b may be a separate device installed in the motor vehicle, which communicate with the mobile communications device 16.

The apparatus 10 includes a central tracking/dispatch center 18, with a computer server or processor 20. The computer server 20 includes conventional memory or storage devices and is configured for maintaining (adding, updating, revising) a database 21 with information retained on the storage device. The database 21 of the tracking/dispatch center 18 receives and stores the motion information and the sound signals on which the crash incident was determined, upon communication from the mobile communications device of such information and signals through a communications network. Further, the database maintains driver information of driver name, address, insurance company and policy number for a plurality of drivers and maintains vehicle crash information of motor vehicle, crash location data, date and time, and optionally one or more sequences of sounds from a crash location, one or more images thereof, for a plurality of crashed motor vehicles. The computer server 20 is further configured for analyzing and reporting on the status of motor vehicles having information tracked though the database of the central tracking/dispatch center 18.

The apparatus 10 includes one or more response services. These may be independent service providers or dependent providers related to the central tracking/dispatch center 18. The illustrated embodiment includes a plurality of tow truck service/features 22 as a response service. The response service includes a tow truck 22 and a portable lantern camera/communications device 24. The portable lantern device 24 includes a high-wattage light 25, a camera 27, and a communications device 29. The light 25 is selectively operable for night illumination. The camera 27 operates in video or still modes for imaging of the crash event, the site, the motor vehicle(s) involved, and creating other picture documentation related to the crash event. The communications device 29 provides two-way communications, such as cellular, wifi, radio, or other, for communicating with the persons involved in the crash event, with the central tracking/dispatch center 18, with the tow service provider, or others as appropriate. Live images may be transmitted as appropriate, for example, but not limited to emergency care and services providers or the dispatcher 18. In the illustrated embodiment, the tow truck 23 optionally includes digital video recording and telecommunications equipment 19 (i.e. MDVR and multiple cameras) for communicating images to the server 20, as well as capturing multiple video images from the tow truck and from the portable lantern camera 24 that communicates with and through the telecommunications equipment. In yet another alternate embodiment, the lantern camera/MDVR 24 provides the on-site imaging functionality and there is no MDVR equipment mounted on the truck except for other wireless cameras carried, for example, in the truck or by other responders, which communicate through the lantern camera/MDVR 24 to the server 20. In an alternate embodiment, the portable lantern device 24 may be embodied in mobile communications device such as a cellphone equipped with a light emitting device, a video imager, and a transceiver device for cellular network communications, and a microphone. The microprocessor is configured with a software application for selectively activating the imager for receiving images (video or separate image) of a crash site, storing the images and selectively communicating the images through the network to receiver. The light provides lighting for night activities at a crash site.

The apparatus 10 further includes a claims servicer 26 that provides motor vehicle claims information and processing services to insurance carriers and motor vehicle owners and operators such as fleet operators.

The application 14, dispatch 18, ISP (independent service provider) 22, and the insurance claims servicer 26 communicate through a communications network generally 30 including wireless, cellular, telephony, radio (two-way), world wide web communications devices and connections, and other suitable electronic communications devices.

The server 20 is configured with the database 21 for tracking motor vehicles and drivers registered with the service, through a fleet operator, an insurance company as a service for its insured, or independently such as parents of young drivers. Further, the apparatus 10 may gainfully be used by a fleet operator as an independent separate system.

Figure 2:
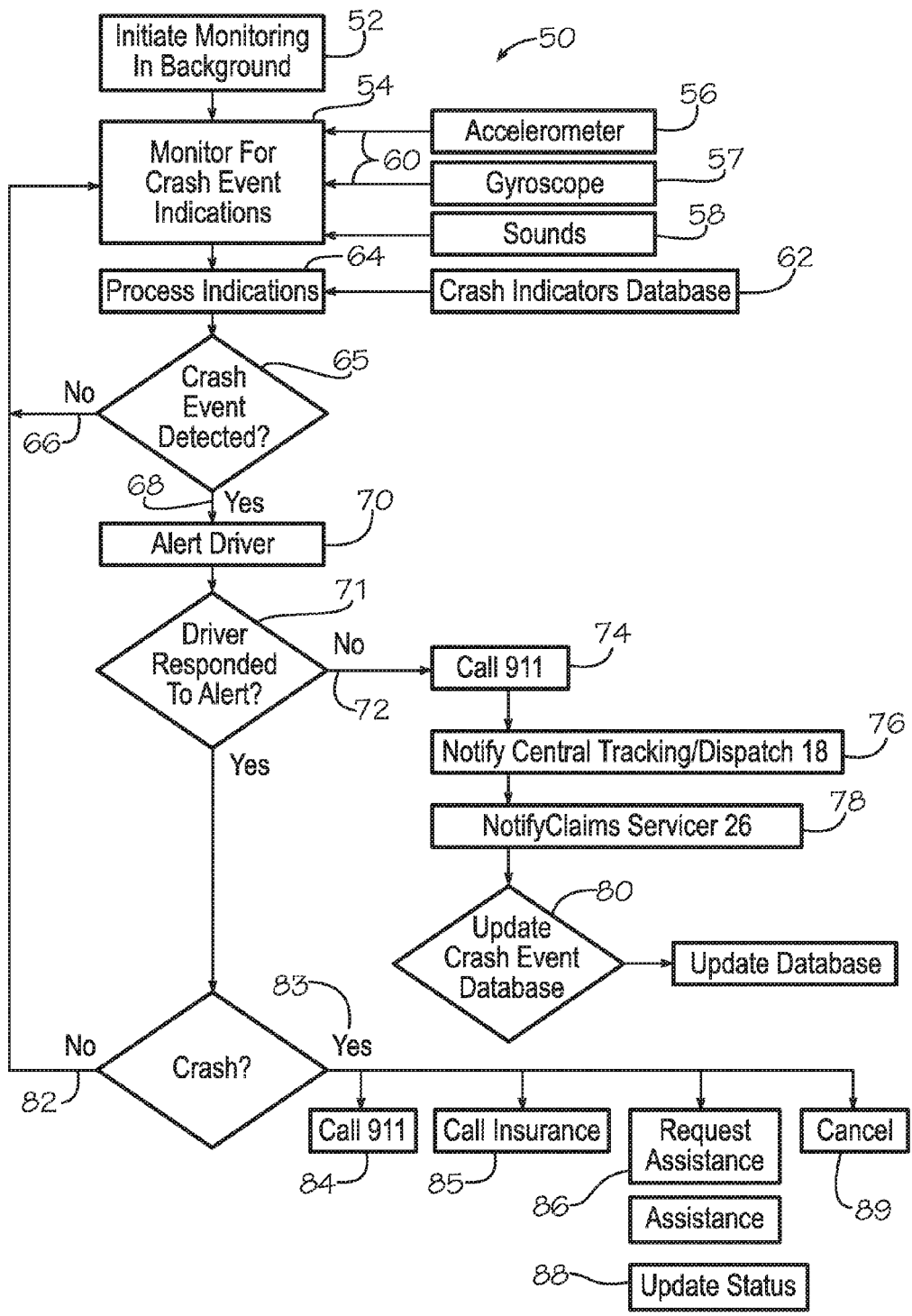
FIG. 2 illustrates a process flow of an exemplary embodiment of an application for a mobile computer device configured for crash detection, response and reporting in accordance with the present invention.

FIG. 2 illustrates a process flow 50 of an exemplary embodiment of the application 14 operable with the mobile communications device 16 for crash detection, response and reporting in accordance with the present invention. The driver initiates 52 operation of the application 14. The application 14 may operate in a background mode of the mobile communications device so that other routine uses of the mobile communications device 16 (such as cellphone calls, internet access, email receiving and transmitting, mapping and routing directions, and other conventional uses) may proceed.

The application 14 monitors 54 for indicators of a crash event. In the illustrative embodiment, detection of motion above a preset speed causes the application 14 to commence the crash detection monitoring functions. The mobile communications device 16 includes conventionally the accelerometer 17a, and the application 14 periodically interrogates the accelerometer by communicating with, and receiving an acceleration signal from, the accelerometer. An alternate embodiment includes the gyroscope 17b that detects changes in angular rotation. The application 14 in this embodiment periodically interrogates the gyroscope 17b for receiving angular rotation signals indicating rapid rotation of the mobile communication device (for example, rolling over of a motor vehicle). The mobile communications device 16 includes a sound receiver or microphone.

The crash indicators include the motor vehicle motion signal and the sounds 58 received proximate the mobile communications device 16. The motion signal may be the acceleration 56 signals, the angular rotation signals 57, or both. The application 14 periodically receives 60 the motion information of the motor vehicle from the force monitoring device or accelerometer and alternatively the angular rotation signals 57 from the angular rotation measuring device. The application 14 also receives audio signals though the microphone. Rapid declaration, rapid changes in rotation, and glass breakage/metal folding sounds indicate a possible crash event. A crash indicator database 62 provides accident or crash event correlated motion and sounds thresholds. The information is processed 64 and compared with standards maintained in the database 62 to determine 65 whether a possible crash event has occurred. If not, the apparatus continues monitoring 66 for crash event signals. The use of multiple indicators of a crash event facilitates reduction of false alarms.

Monitoring crash event indications 54 involves detecting sounds with a mobile device microphone that exceed a predetermined threshold, detecting changes in acceleration with 3-axis (x, y, z) accelerometers that exceed a predetermined threshold, and/or detecting changes in angular rotation that exceed a predetermined threshold. Upon detecting one or more high threshold events, the application 14 may check a GPS-based speed for evidence that the mobile communications device is slowing or rotating rapidly or has stopped moving. If the GPS-based speed is unchanged, the application 14 would reject 82 the detected event and return to crash monitoring 54. If the GPS-based speed indicated slowing/rotation/stopping, the processing of the sound and motion recording files, which would include recording for a predetermined period of pre-event sound and motion information and post-event recording of such information for a second predetermined period.

In an illustrative embodiment, the application 14 maintains a continuous recording database of the motion and audio signals received during monitoring. The database is configured for maintaining a lead portion (pre-event) of a predetermined period preceding the possible crash event and a trailing portion (post-event) of a second predetermined period post-possible crash event. The recorded database uploads to the central tracking/dispatch center 18 during notification communication of a possible crash event to the central tracking/dispatch center 18. The database 21 of the tracking/dispatch center 18 receives and stores the motion information and the sound signals on which the crash incident was determined, upon communication from the mobile communications device 16 of such information and signals through a communications network 30. Further, the database 21 maintains driver information of driver name, address, insurance company and policy number for a plurality of drivers and maintains vehicle crash information of motor vehicle, crash location data, date and time, and optionally one or more sequences of sounds from a crash location, one or more images thereof, for a plurality of crashed motor vehicles.

If the application determines 68 that a possible crash event has occurred, the application alerts 70 the driver. Determination of a possible crash event in the illustrative embodiment involves both sound and motion crash indicators being determined as true (i.e., exceeding respective predetermined thresholds). An exceeded sound threshold alone or an exceeded acceleration threshold alone or an exceed angular rotation alone may be rejected as indicating a crash event and processing would return to monitor 54. The combination may indicate a crash event. The alert 70 presents a visual message 104 (see FIG. 5) on a display of the mobile communications device 16. The alert 70 may include an unmistakable audio tone at high volume to draw the driver's attention to the mobile communications device 16. The driver may respond in the negative and the application 14 then returns to the monitor 54 processes. If the driver confirms the crash event, the application presents 72 selective choices for calling 911 or emergency contact, contact the insurance carrier, request roadside assistance, or cancel, as discussed below in reference to FIG. 6.

If the driver does not respond 72 after a predetermined period of time (for example, but not limitation, a period of 60 seconds), the application 14 initiates assistance. This includes notification to emergency centers (such as to local police authorities) 74, notification 76 to the central tracking/dispatch center 18, and initial accident notification 78 to the claims service center 26. The application may also evaluate 80 whether the accelerometer and sounds information should be uploaded to the crash indicator database.

The driver, upon being alerted to the possible crash event, may selectively respond for the system to ignore 82 the possible crash event (i.e., no crash event occurred); or 83 to initiate 84 telephone contact with appropriate local police authorities; to contact the insurance carrier 85 or to request 86 assistance. The application provides updates 88 to the driver as to the status of the requested assistance. Such updates for example, may include contact information for a tow truck operator and arrival time. The driver may select to cancel 89 the notifications and processing of crash event services by the application 14.

The application 14 accordingly synchronizes the crash event with the motorists, the date and time of crash event, the place of the crash event, and the severity of the crash event. This information provides a basis for accident reconstruction, predictive indications of potential loss and injury, and also perfects the validity of the report of the crash event by the motorist involved while supporting official investigative reports. The detected and recorded motion information (i.e., the acceleration signal and the angular rotation signal) provide additional information useful for accident reconstruction evaluations.

Figure 3:
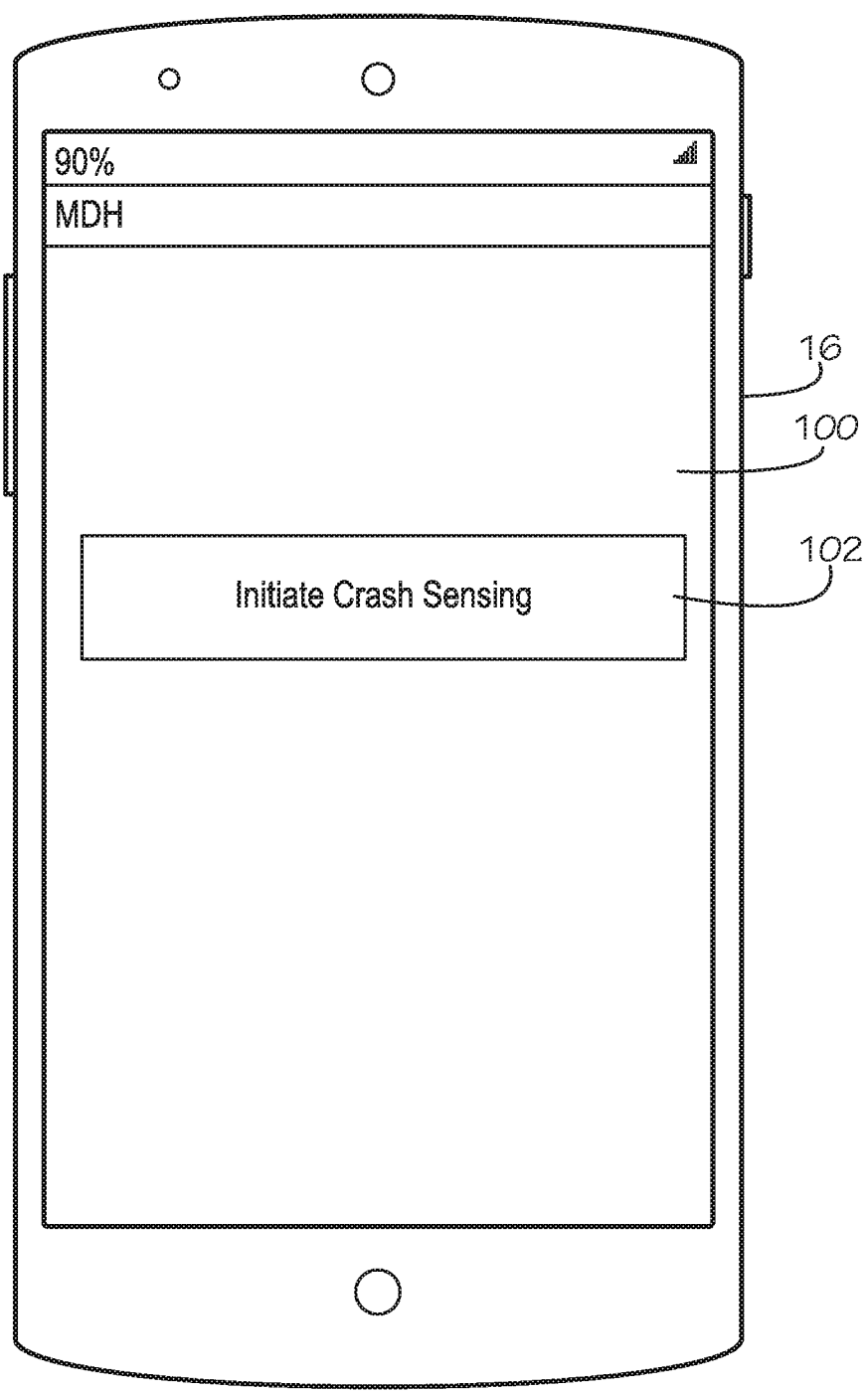
FIG. 3 illustrates a screen image for operating the crash detection, response and reporting application.

FIG. 3 illustrates a screen image 100 for operating the crash detection, response and reporting application 14 on the mobile communications device 16. The application 14 displays an activate button 102. Operating the button 102 causes the application 14 to operate in the background of the mobile communications device 16, monitoring for a possible crash event, and responding appropriately, as discussed above. It is to be appreciated that the initiate screen 100 (and the monitoring screen 110 (FIG. 4) are in an exemplary embodiment of a stand-alone application. A production application in an alternate embodiment such as provided to customers of an insurance provider, may embed the application 14 within a hosting application for the insured of the insurance provider or a similar hosting application with other consumer-facing features and services of the provider (for example, display a report of policy terms and limits, provide for changes to policy coverage, add, delete or modify driver and motor vehicle information, and other insurance servicing features.)

Figure 4:
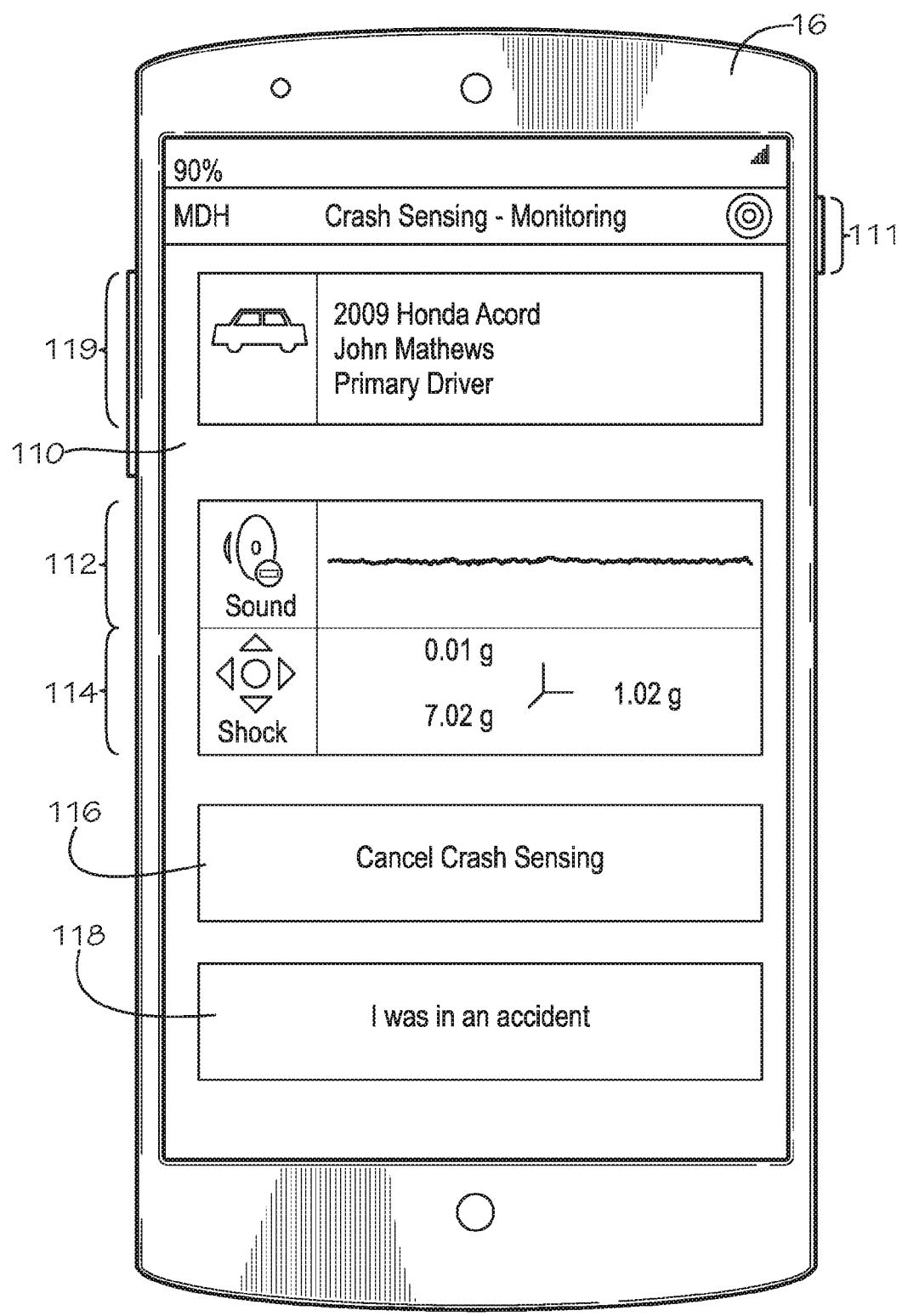
FIG. 4 illustrates a screen image during monitoring the operation of the crash detection, response and reporting application.

FIG. 4 illustrates the monitoring screen 110 that may be displayed during the monitor processing of the crash detection, response and reporting application 14. The screen 110 includes a status window 111. The status window displays a short descriptive phrase as to the status of the application 14 shown in Table 1 below:

TABLE 1

Status Window Phrases

| Phrase | Definition |
| --- | --- |
| Crash Sensing - Monitoring | the application 14 is monitoring for a possible crash event |
| Crash Detected - Triggered | the application 14 detects sound and motion information indicating a crash event may have occurred |
| Crash Sensing - Confirmed | a crash event has occurred; the application 14 provides action options for selection by the driver |
| Crash Sensing - Reported | the crash event has been reported and status of action options and of response servicers are displayed |

The window 111 in FIG. 4 indicates that the application 14 is monitoring for a possible crash event. The application 14 monitors sound events, and may provide a real-time signal display 112 on the screen 110. Further, the screen 110 displays 114 the three axis acceleration of the motor vehicle. A cancel button 116 causes the application to cease operating. A "in-accident" button 118 enables the driver to initiate crash event processing by the application 14, including notification to the central tracking/dispatch center 18 that a crash event has occurred. In response to the "in-accident" button 118, the application 14 communicates crash information, vehicle information and driver information using the communications of the mobile communications device 16. A window 119 displays the driver and vehicle information. Alternatively, the display may present a graphic (not illustrated) of the motor vehicle based on the detected changes in the angular rotation of the mobile communications device 16.

Figure 5:
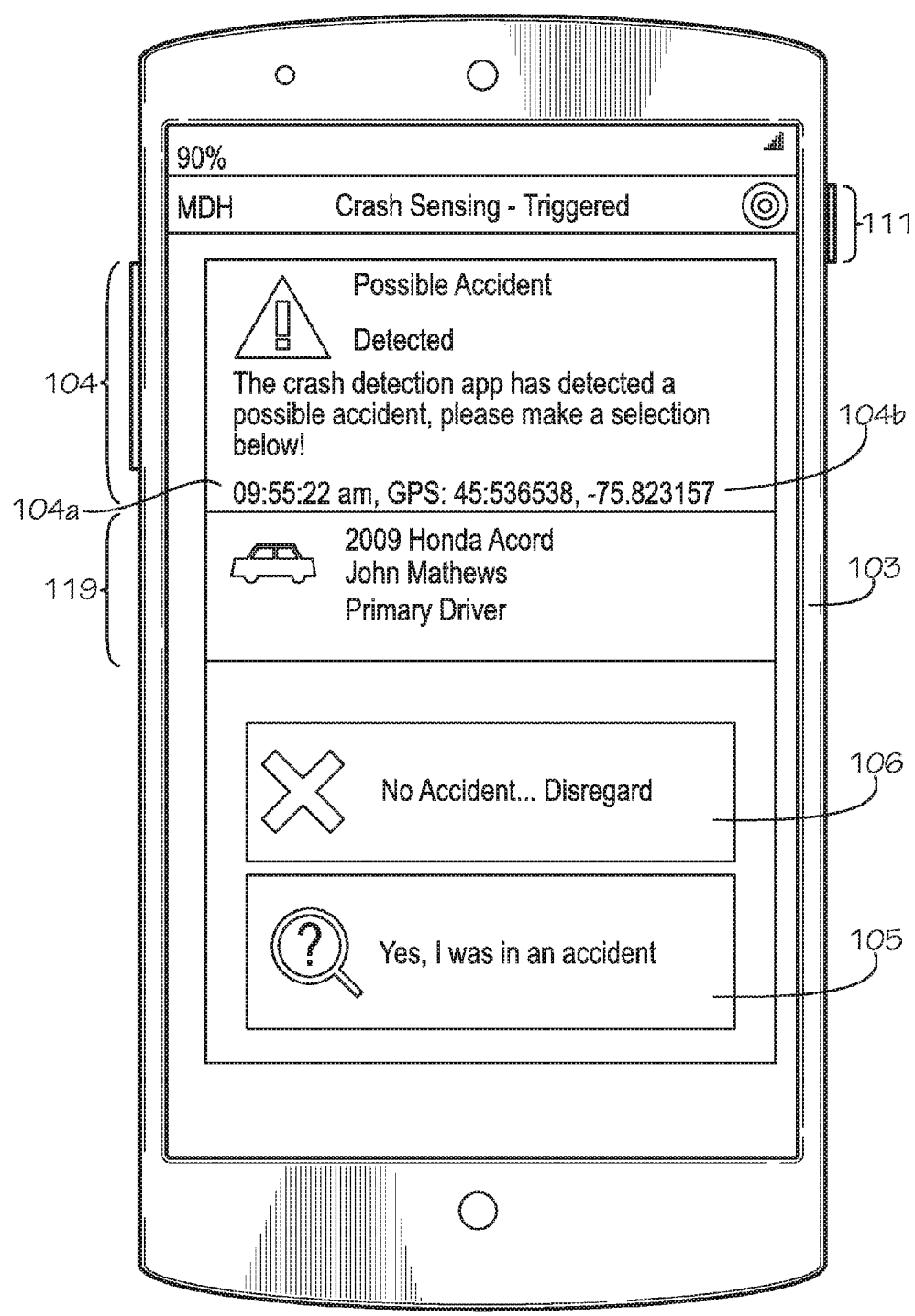
FIG. 5 illustrates a crash detected screen displayed when the crash detection, response and reporting application determines that a possible crash event may have occurred.

FIG. 5 illustrates a crash detected screen 103 displayed when the application 14 determines that a possible crash event may have occurred. The screen 103 may be accompanied with an unmistakable audio tone at high volume to draw the driver's attention to the mobile device. The screen 103 displays a possible event window 104 that includes the time 104*a* and GPS coordinates 104*b* as well as the vehicle information 119 window. The screen 103 includes a "no accident—disregard" button 106 and an accident confirmation button 105 with text "Yes, I was in an accident." The driver operates the "I was in an accident" button 105 to confirm the detection of a crash event. The driver operates the "no accident—disregard" button if the detection was incorrect as no crash incident had occurred.

The "I was in an accident" button 118 shown in FIG. 4 is for circumstances where the driver wants to proceed manually to report a crash event without the application detecting the crash event; FIG. 5 provides the confirmation "accident" button 105 for the driver to confirm that the detection of the crash event by the application was correct. Both buttons 118 and 105 cause the application 14 to proceed to crash event processing in reference to FIG. 6. The "no-accident—disregard" button 106 causes the application 14 to return to the monitoring screen 110 and monitoring as shown in FIG. 4.

Figure 6:
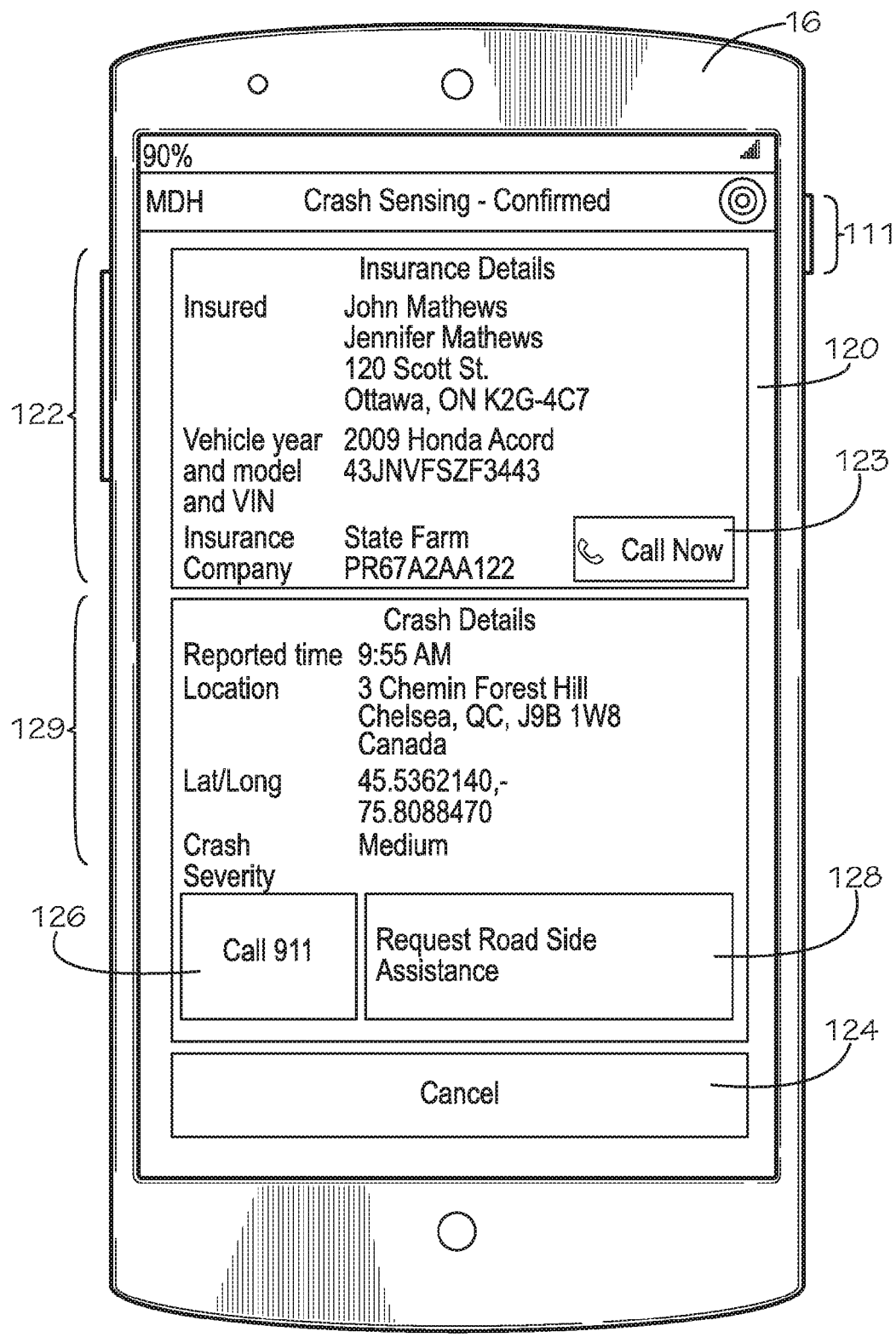
FIG. 6 illustrates a screen image following detection of a possible crash event by the crash detection, response and reporting application.

FIG. 6 illustrates a screen 120 displayed to the driver on the mobile communications device 16 following detection of a possible crash event by the crash detection, response and reporting application 14. The window 111 in FIG. 6 indicates that the application 14 acknowledges or confirms receiving the crash event notice following the use of the confirm button 118. The screen 120 includes an insurance window 122 that displays the name and address of the insured; the make, model and vehicle identification number of the insured motor vehicle; and the insurance carrier and policy number. The screen 120 provides selectively actuated buttons to direct the activities of the application 14. A "call" button 123 causes the application 14 to imitate a telephone call to the insurance carrier. A "cancel" button 124 directs the application to resume monitoring for a possible crash event. The application 14 notifies the central tracking/dispatch center 18. A "call 911" button 126 directs the application 14 to initiate a telephone call to local emergency services such as local police and ambulance services.

A "request assistance" button 128 initiates services from independent service providers 22. In the illustrated embodiment, the independent service provider 22 is a roadside assistance service. The application 14 communicates this request to the central tracking/dispatch center 18. The information communicated by the application 14 includes the vehicle identification number, the driver information and contact phone number, and the location, time, and event. A crash event window 129 displays crash event information including the report time, the location of the crash event (address, if determined), a geographical coordinate designation, and crash severity. The "cancel" button 124 cancels the reporting and status monitoring activities. Appropriate information for cancellation communicates from the mobile communication device 16, such as to the tracking/dispatch center 18 and/or the service provider 22.

Figure 7:
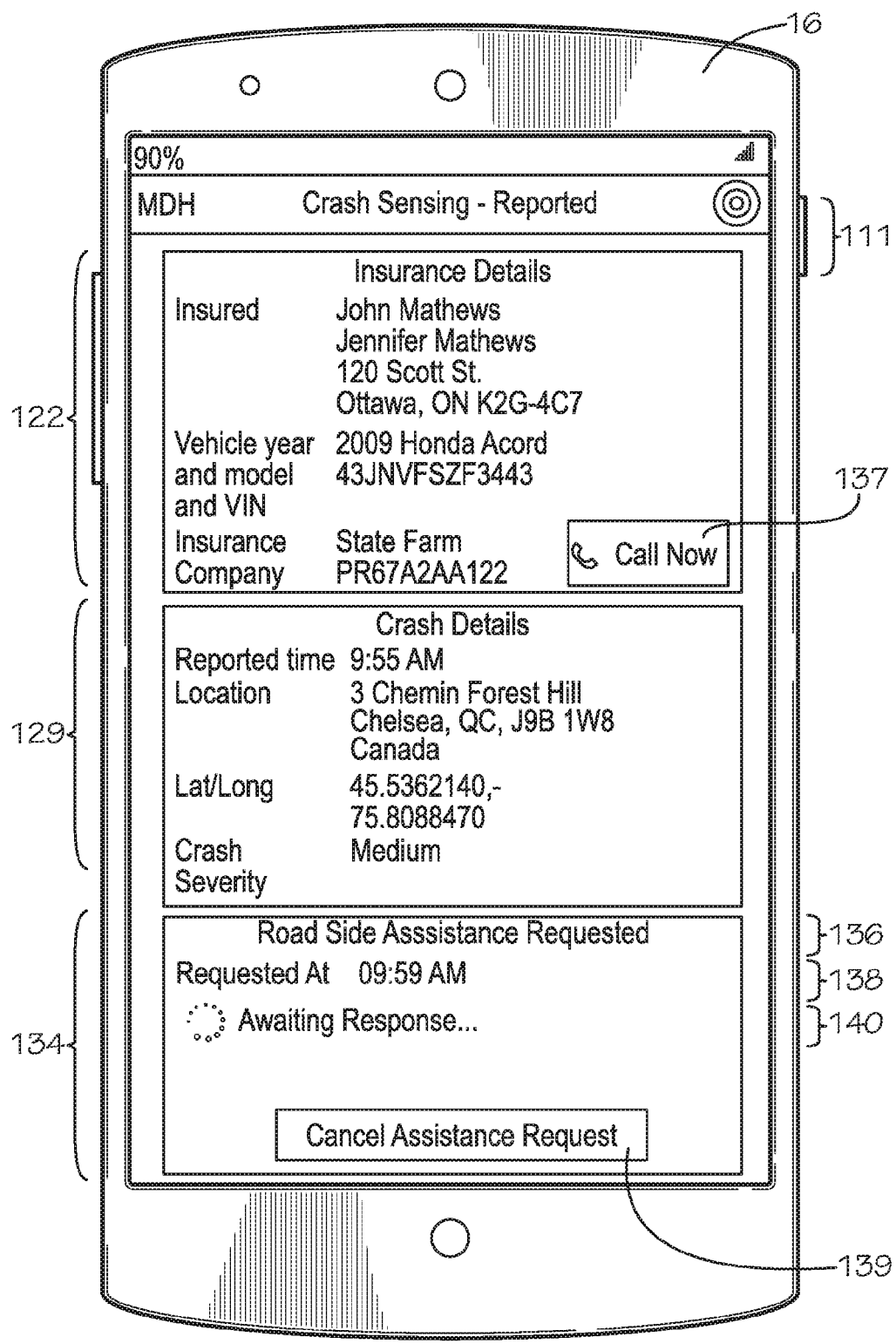
FIG. 7 illustrates a screen image of the crash detection, response and reporting application after a request for assistance.

FIG. 7 illustrates a screen 130 of the crash detection, response and reporting application 14 after a request for assistance is selected. The window 111 in FIG. 7 indicates that the application 14 has reported the crash event. The screen 130 displays the insurance window 122 and the crash information window 129. Optionally, the screen 130 may display the time of detection of the crash event and the time the crash event was reported to the central tracking/dispatch center 18. The screen 130 includes an update field 134. The application 14 presents in the update field 134 the status of the requested assistance. This includes the type 136 of assistance requested, the time 138 the request was made, and the status 140 of the response. The screen 130 may include an initiate emergency call button 137. A cancel assistance button 139 communicates a cancellation notice to the independent service provider 22 and to the tracking/dispatch center 18.

Figure 8:
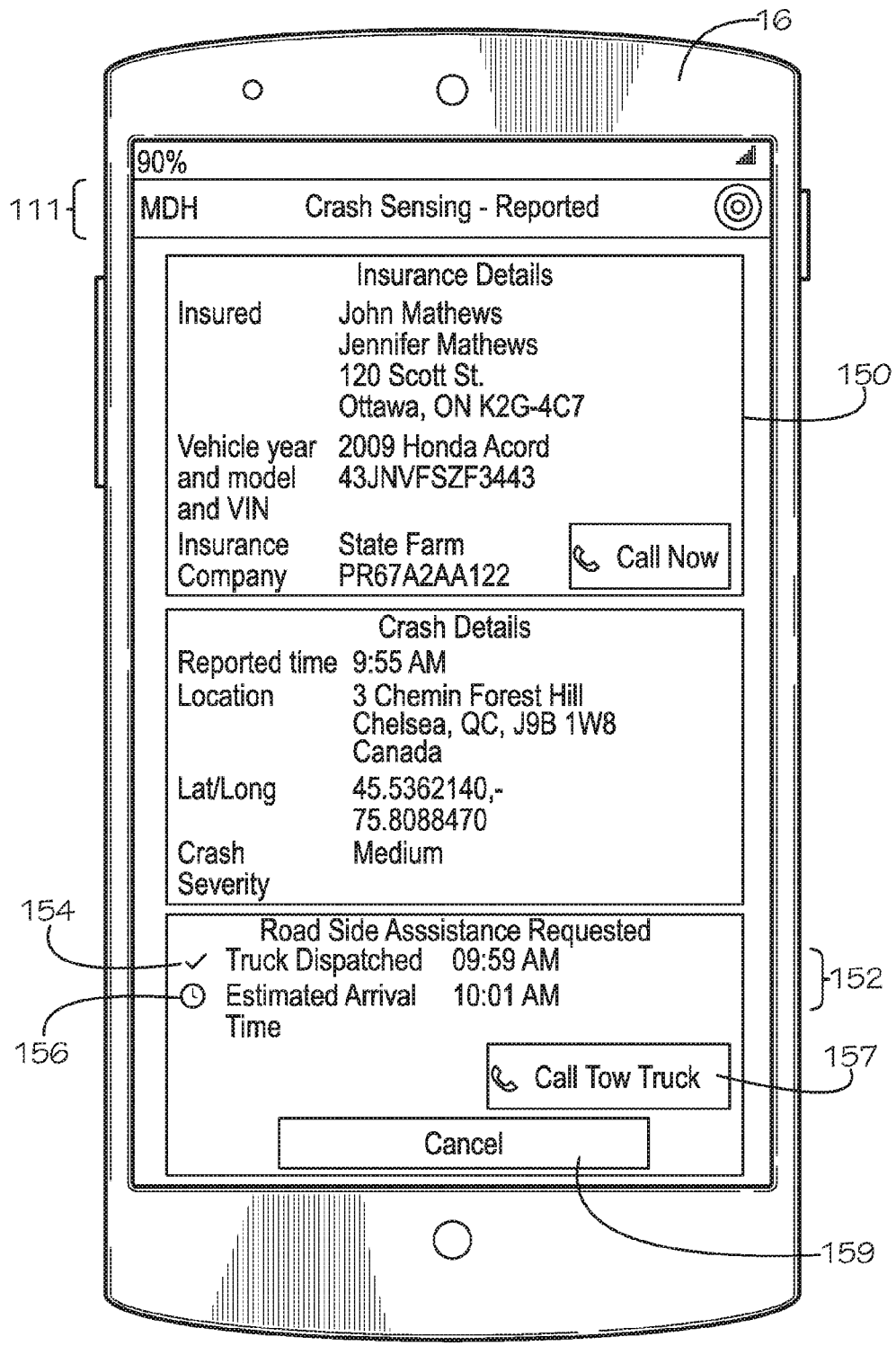
FIG. 8 illustrates a second screen image of the crash detection, response and reporting application after a request for assistance.

FIG. 8 illustrates a second screen 150 of the crash detection, response and reporting application after a request for assistance, depicting updated assistance information 152. This may include the time of dispatch 154 and an estimate time of arrival 156. The update field may also present (not illustrated) the contact information of the tow truck driver. A call button 157 initiates telephonic communication with the operator of the tow truck. Optionally, a confirm arrival button enables the driver to communicate status information to the tracking/dispatch center 18. A cancel button 159 communicates a cancellation notice to the independent service provider 22 and to the tracking/dispatch center 18.

Although not illustrated, the application 14 includes user setup screens for entry of driver and vehicle information. This information includes the driver name and address, insurance company and policy, and the vehicle identification number and make and model. The information uploads to the database 21 on the server 20. The native application, downloaded and installed on the mobile communications device 16, maintains background processes such as environmental monitoring that occurs. The environmental conditions for monitoring may be selected through appropriate control screens. For example, environmental monitoring may occur under conditions which correspond to the user driving or riding in a moving vehicle above a specified speed (e.g. 5 mph). Optional detection of known vehicle RF emitters (e.g. BT or WiFi) may be used to enhance recognition of in-vehicle operation. That is, detection of RF signals may cause the application 14 to commence monitoring. In an alternate embodiment, the application 14 operates from a selection button provided through a hosting application such as provided as an SAAS web site of an insurance carrier or fleet operator.

As discussed above, the environmental monitoring includes periodically receiving and evaluating x, y, z accelerometer outputs and/or gyroscope axis output (such as accelerometer or gyroscope devices embodied in the mobile communications device 16) and microphone (e.g. engine sounds, ambient sounds) for communication of sounds for analysis of possible crash events. In addition, the application may receive motor vehicle speed signals (either GPS or handset-based cellular assisted) and configured for translating to approximate vehicle x, y, z coordinates and thus speed and angular rotation.

A determination of a significant possible crash event may be made upon detection of multiple ambient conditions, such as: high negative acceleration in the motor vehicle x or y axis, rapid negative change in vehicle speed, high or rapid changes in angular rotation, and sounds corresponding to vehicle impacts. An alternate embodiment includes spectral analysis for sounds of glass breaking and metal shearing, bending, folding, or otherwise experiencing high impact change, in the possible crash event determination. The determination is made based on a reasonable match of sounds from the event with sounds from known crash events. Such information may be maintained in a crash indicators database.

Upon determination 65 of a significant possible crash event, actions may be initiated (automatically or selectively) which may include:

a. Prompting 70 the mobile communications device 16 via screen message 104 and notification sound requesting driver confirmation 105, 106 whether a crash event has occurred and whether the driver wants to place an emergency 911 call.

b. If the user confirms a crash, the application may immediately send 83 a message to third-party for roadside assistance initiation and also to the tracking/dispatch center 18.

c. If the user does not respond to the application notification (e.g. because the driver is injured or otherwise unable to respond), the application may prompt the driver with an audible message to confirm verbally to call 911 via voice command. Optionally, the application may be configured to include the user/driver opting into an automatic crash notification feature which activates a speakerphone-based 911 call to permit a 911 operator to interrogate the driver hands-free.

Upon initiation of the roadside assistance call, the application 14 may be used to communicate the status of roadside assistance response. This feature may be subject to the level of integration with the roadside assistance company or other service provider.

The application of the present invention provides improved reporting of motor vehicle accident and crash information to persons having interest in the driver status (such as, parents, central tracking/dispatch, fleet operators, and others), while providing early initiation and first notice to the insurance claim service of the crash event, and providing dispatch of independent service provider services 22 such as tow truck services, though a machine-to-machine monitor, tracking, and notification system. The first notice available through the monitor, tracking, and notification system facilities claims processing by providing the identification of the insured motorist, the motor vehicle involved, the location of the vehicle and the crash event, and updates of the status. Further, the application in an alternate embodiment includes video/photo recording features following detection/confirmation of a crash event. This enables the driver to generate video/photo image files that may automatically upload to the tracking/dispatch center 18 and servers 20 to complement or substitute for tow truck-generated video/photo information.

With reference to the drawings and FIGS. 1 and 2, the system 10 detects the crash of the motor vehicle with crash detection device carried with the motor vehicle for crash response and reporting. The driver (or passenger) carries or brings into the motor vehicle the mobile communications device 16 configured with the sensor that generates the motion signal responsive to motion of the mobile communications device and a sound receiver for receiving a sound signal of sound proximate the mobile communications device. The motion signal may be the acceleration signal from the accelerometer 17a, the angular rotation signal from the gyroscope 17b, or both. The mobile communications device 16 configured with software instructions or application 14 that upon execution monitors for an occurrence of a crash event by periodically interrogating (a) the motion signal to determine whether a change in motion exceeds a predetermined motion threshold and (b) the sound signal to determine whether a sequence of sensed sound signals within a predetermined period matches crash sound indicators of (i) glass breakage and (ii) metal folding. A display that upon determining the occurrence of the crash incident displays a possible event window with a selectable option of the driver or passenger (a) to return the mobile communications device to monitoring for the occurrence of the crash incident or (b) to confirm the crash incident. Upon a failure of selection of one of the selectable options within a predetermined period, communicating by the communications network 30 an identifier associated with the mobile communications device 16 and crash incident information including the location data to a tracking and dispatch center 18 having a pre-registered record of the mobile communications device 16 and configured for receiving and storing the acceleration information and the sound signals on which the crash incident was determined. The servicer 22 dispatched by the tracking and dispatch center 18 responds to the site of the crash incident based on the location data.

The claims service center 26 is configured for servicing an insurance claim arising from the crash incident as reported by the tracking and dispatch center 18. Additional incident services may be provided, such as providing through the servicer 22 a transport vehicle for transporting a damaged motor vehicle to the crash site and also providing insurance claims process services for the motor vehicle owner, operator and insurer including documentation, images, and accident incident details about the operation of the motor vehicle.

With reference to FIGS. 1 and 2, the system 10 in accordance with the present invention operates 52 for detecting a crash incident of the motor vehicle with crash detection response and reporting. The system 10 provides (a) the plurality of mobile communications devices 12 each carried by a driver or passenger in the motor vehicle. Each mobile communications device 12 has the motion sensor (accelerometer 52 as an acceleration sensor and/or gyroscope as an angular rotation sensor) that generates the motion signal responsive to motion of the mobile communications device 12 and the sound receiver for receiving a sound signal of sound proximate the mobile communications device. The mobile communications device 12 is configured with software instructions that upon execution monitors 54 (preferably in the background of the operation thereof) for the occurrence of a crash event. The software instructions are configured 64 for (b) periodically interrogating (a) the motion signal to determine whether the change in motion exceeds a predetermined threshold, (that is, of the accelerometer 56 to determine whether a change in acceleration exceeds a predetermined acceleration threshold and/or the gyroscope to determine whether a change in angular rotation exceeds a predetermined rotation threshold), and (b) the sound signal to determine whether a sequence of sensed sound signals within a predetermined period matches crash sound indicators of (i) glass breakage and (ii) metal folding. Then, (c) based on the interrogations of the motion signal(s) and the sound signal, the mobile communications device 12 determine 65 whether a crash incident occurred, and if so 68 the display of the mobile communications device 12 alerts the driver 70 and displays a possible event window 104 (see FIG. 5) for selection by the driver of one of (a) return 106 the mobile communications device to monitoring 54 for the occurrence of a crash event and (b) to confirm 105 the crash event. In one aspect the mobile communications device (d) makes an alert, which may be audible or visual. In response, (e) determining 71 whether the alert generated a crash response by the driver through the mobile communications device, and if not, 72 communicating a location data of the crash incident to a service provider for response. For example, upon a failure of selection of one of the selectable options within a predetermined period, the mobile communications device 12 communicating by a communications network 30 an identifier associated with the mobile communications device and crash incident information of the location data, date and time to the tracking and dispatch center 18 for entry into the database 21. Further, the system 10 includes at least one response servicer 22 for dispatching by the tracking and dispatch center to the site of the crash incident based on the location data, the response servicer 22 providing the lantern device 24 having the light 25, the imaging device 27, and a communications device 29, whereby images received by the imaging device 27 communicate by the communications device 29 through the network 30 to the tracking and dispatch center 18. The images may be video or single frame. Further, (f) the tracking and dispatch center 18 communicating a status of the service provider 22 response to the mobile communications device 12. Alternatively, the response servicer 22 may provide the vehicle transporter (tow truck 23) for vehicle pull-out or movement at the crash site and for transport to a repair center or storage facility. The tow truck may include an electronic data storage device for communication with the imaging device and recording of images prior to communicating the recorded images to the tracking and dispatch center 18.

An alternate embodiment includes alternative reporting and action path for commercial vehicle operators that addresses the difference in procedures for motor vehicles and trucks used in cartage. For example, the third party servicer may include cargo insurance carriers, emergency response teams for tracking and fleet operators, hazardous materials handling and clean-up services, salvage and similar such services. Such embodiment provides for simultaneous reporting and alternate claim information streams.

The crash detection, response and reporting apparatus 10 according to the present invention establishes, occupies, and provides an effective interlinked network of a plurality of motor vehicles 12 each tracked locally during motor vehicle operation by a microprocessor-based application 14 that executes software code on the mobile communications device 16 of the driver, featuring communications networked driver/motor vehicle, central tracking/dispatch monitoring center 18, and attendant services including claims servicer 26 for an insurance carrier and support features for drivers such as tow truck services 22, for an end-to-end motor vehicle status tracking and reporting system featuring improved first notice of loss and machine-to-machine communicating between the motor vehicle, the monitoring center, and the services offering independent service providers (tow truck operators or claims servicers, for illustrative non-limiting examples), and enhanced revenue for insurance providers tracking motor vehicle status, incidents, and incident or accident reconstruction, documentation, and adjustment. The improved first notice of loss provided by the operation of the automated crash detection application 14 benefits insurance carriers, fleet operators, and individual motor vehicle operators by identifying the insured motorist or driver and the location of the incident involving the driver and the motor vehicle while providing coverage details to improve claims processing efficiencies and advance the handling and resolution of claims though automatic or manual reporting of incident occurrences and communication to service providers of assistance needs. The system tracks and monitors vehicle care and logistics, while further assisting with evaluation of accident causes and reconstruction for resolution purposes.

The application 14 operates 52 in a background mode automatically or upon initiation by a driver and resolves locating insurance information from a wallet or storage within the motor vehicle. Independent service providers 22 such as tow truck operators benefit with automated identification of insured drivers, motor vehicle or incident location, and automatic or manual initiation of service support and response. Images of service response at the incident location are readily uploaded using the lantern 24 and the video and telecommunications equipment 19 of the service provider 22 to the monitoring center 18 to provide documentation for service fees while potentially reducing claims against service providers. Insurance claims servicers 26 obtain automated and seamless communications of identified motorist claimants and improved timely first notice of loss and further benefit with increased efficiency of services dispatch processing and handling of claims resolutions including as appropriate access and uploading of live video and audio from incidents. Fleet (as well as individual) motor vehicles operated by drivers registered with the central tracking/dispatch monitoring center 18 are readily monitored, assisted and reported on appropriately.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The crash detection, response and reporting apparatus and method can be a component of a single system, multiple systems, and/or geographically separate systems. The crash detection, response and reporting apparatus and method can also be a subcomponent or subsystem of a single system, multiple systems, and/or geographically separate systems. The crash detection, response and reporting components can be coupled to one or more other components (not shown) of a host system or a system coupled to the host system.

One or more components of the crash detection, response and reporting apparatus and method and/or a corresponding interface, system or application to which the crash detection, response and reporting apparatus is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistant devices, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the crash detection, response and reporting apparatus and method can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include but are not limited to, removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the crash detection, response and reporting apparatus and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the crash detection, response and reporting apparatus and method and corresponding systems and methods include: microcontrollers with memory (such as electronically erasable programmable read only memory (EEPROM)), embedded microprocessors, firmware, software, etc. Furthermore, aspects of the crash detection, response and reporting apparatus and method and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the crash detection, response and reporting apparatus and method and the corresponding systems and methods is not intended to be exhaustive or limit the systems and methods to the precise forms disclosed. While specific embodiments of, and examples for, the crash detection, response and reporting apparatus and method and corresponding systems and methods are described herein for illustrative purposes, various equivalent modifications are possible within the scope of the systems and methods, as those skilled in the relevant art will recognize. The teachings of the crash detection, response and reporting apparatus and method and corresponding systems and methods provided herein can be applied to other systems and methods, not only for the systems and methods described above.

The elements and actions of the various embodiments described above can be adapted, modified, and combined to provide further embodiments in accordance with the present invention of the crash detection, response and reporting apparatus and methods and corresponding systems and methods in light of the above detailed description. While this invention has been described in detail with particular reference to illustrative, non-limiting embodiments thereof, the principles and modes of operation of the present invention have been described in the foregoing specification. The invention is not to be construed as limited to the particular forms disclosed because these are regarded as illustrative rather than restrictive. Moreover, those skilled in the art may make modifications, variations and changes thereto without departing from the spirit and scope of the invention as described by the following claims.

What is claimed is:

1. A motor vehicle crash detection system, comprising:
a tracking and dispatch center having a computer processor configured with an electronic memory device that maintains driver information of driver name, address, insurance company and policy number for a plurality of drivers and maintains vehicle crash information of motor vehicle, crash location data, date and time, and optionally one or more sequences of sounds from a crash location, one or more images thereof, for a plurality of crashed motor vehicles;
a plurality of mobile communications devices, each associated with a respective one of the plurality of drivers and configured with a sensor that generates a motion signal responsive to motion of the mobile communications device and a sound receiver for receiving a sound signal of sound proximate the mobile communications device;
the mobile communications device configured with software instructions that upon execution monitors for an occurrence of a crash event by periodically interrogating (a) the motion signal to determine whether a change in motion exceeds a predetermined motion threshold and (b) the sound signal to determine whether a sequence of sensed sound signals within a predetermined period matches crash sound indicators of (i) glass breakage and (ii) metal folding;
a display that upon determining the occurrence of the crash incident displays a possible event window for selection of one of (a) to return the mobile communications device to monitoring for the occurrence of the crash incident and (b) to confirm the crash incident;
upon a failure of selection of one of the selectable options within a predetermined period, the mobile communications device communicating by a communications network an identifier associated with the mobile communications device and crash incident information of a location data, date and time to the tracking and dispatch center; and
at least one response servicer for dispatching by the tracking and dispatch center to a site of the crash incident based on the location data, the response servicer provides a lantern device having a light, an imaging device, and a communications device, whereby images received by the imaging device communicate by the communications device through the network to the tracking and dispatch center.

2. The motor vehicle crash detection system as recited in claim 1, wherein the response servicer further provides a vehicle transporter, whereby the crashed motor vehicle may be transported from the crash location.

3. The motor vehicle crash detection system as recited in claim 1, wherein the imaging device is operable for video.

4. The motor vehicle crash detection system as recited in claim 1, wherein the imaging device is operable for single frame images.

5. The motor vehicle crash detection system as recited in claim 1, further comprising an electronic data storage device installed for communication with the imaging device for recording of images prior to communicating the recorded images to the tracking and dispatch center.

6. The motor vehicle crash detection system as recited in claim 1, further comprising a claims servicer for processing claims arising from the detected crash occurrence.

7. The motor vehicle crash detection system as recited in claim 1, wherein the sensor comprises an accelerometer that generates an acceleration signal as indicative of the motion of the mobile communications device.

8. The motor vehicle crash detection system as recited in claim 1, wherein the sensor comprises a gyroscope that generates an angular rotation signal as indicative of the motion of the mobile communications device.

\* \* \* \* \*